United States Patent [19]
Kiyohara et al.
[11] Patent Number: 4,760,409
[45] Date of Patent: Jul. 26, 1988

[54] INK SUPPLY DEVICE IN AN INK JET RECORDING APPARATUS

[75] Inventors: Takehiko Kiyohara, Zama; Hideo Fukazawa, Yokohama, both of Japan

[73] Assignee: Canon Kabushiki Kaisha, Tokyo, Japan

[21] Appl. No.: 79,005

[22] Filed: Jul. 29, 1987

[30] Foreign Application Priority Data

Jul. 31, 1986 [JP] Japan ................................ 61-180565

[51] Int. Cl.⁴ ................................ G01D 15/16
[52] U.S. Cl. ................................ 346/140 R
[58] Field of Search ................................ 346/140

[56] References Cited

U.S. PATENT DOCUMENTS 4,202,267 5/1980 Heinzl ................ 346/140 X
4,568,954 2/1986 Rosback ................ 346/140
4,719,475 1/1988 Kiyohara ................ 346/140

FOREIGN PATENT DOCUMENTS 49-144645 12/1974 Japan .
53-15659 4/1978 Japan .
56-28968 3/1981 Japan .
59-227458 12/1984 Japan .
60-125671 7/1985 Japan .

*Primary Examiner*—Joseph W. Hartary
*Attorney, Agent, or Firm*—Fitzpatrick, Cella, Harper & Scinto

[57] ABSTRACT

An ink supply apparatus for an ink jet recording apparatus comprising an ink bag made of a flexible material and a plug member provided for leading out ink in the ink bag and attached to the ink bag in sealing manner to a hermetically sealed ink bag, a concaved hole being provided at the side of the plug member which is faced to the inside of the bag, a sealing surface of the plug member with respect to the bag being formed to be a boot-like shape, and a reinforcing portion being formed for bridging the inside of the concaved hole.

18 Claims, 3 Drawing Sheets

INK SUPPLY DEVICE IN AN INK JET RECORDING APPARATUS

BACKGROUND OF THE INVENTION

1. Field of the Invention

This invention relates to an ink supply device in an ink jet recording apparatus, and in particular to an ink supply device of the type in which ink is supplied to a recording head from a hermetically sealed ink bag formed of a flexible material such as a plastic sheet.

2. Related Background Art

As one type of a recording apparatus such as a printer or an image forming apparatus, use is made of an ink jet recording apparatus in which ink droplets are caused to fly from a plurality of ink discharge ports to thereby form dot patterns on a sheet (a recording medium such as recording paper or a plastic sheet).

Ink which is a recording agent is usually supplied from an interchangeable ink container set at a predetermined location in the recording apparatus to a recording head (ink jet head) through an ink supply tube.

Where a hard box type container is used as the ink container, a vent hole for eliminating any variation in internal pressure is necessary, and this leads to problems; for example, ink, solvent evaporates to degenerate (increase the viscosity of) the ink or cause leakage of the ink.

So, it has been practised to use as the ink container a hermetically sealed ink bag formed of a flexible material such as a plastic sheet.

In this case, a plug member is attached to the ink bag in a sealing manner so that ink in the ink bag may be supplied to the recording head through an ink supply path formed, for example, by a hollow needle or the like through the plug member.

Also, this ink bag is used while being usually contained at a predetermined position within the case of a cartridge.

Now, the ink supply device according to the prior art has suffered from the following problems.

Firstly, the air in the ink bag goes round to the neighborhood of the inlet of the ink supply path formed by the hollow needle or the like, and this has sometimes caused unstable feeding of the ink or clogging of the ink supply path.

Also, the plug member has been insufficient in its close contact with the ink bag and thus, the sealing property of the sealed portion has been liable to become insufficient.

Further, in some cases, when containing and holding the flexible ink bag within the case of a cartridge, it has been difficult to position the ink bag and maintain its shape.

SUMMARY OF THE INVENTION

It is a first object of the present invention to solve the above-noted problems peculiar to the prior art and to provide an ink supply device in an ink jet recording apparatus which comprises a hermetically sealed ink bag of a flexible material capable of reliably and stably leading out the ink in the ink bag through a plug member.

It is a second object of the present invention to provide improvements in the plug member attached to the ink bag in a sealing manner and provide the structure of an ink supply device which can improve the sealing property, strength and durability of the ink outlet portion of the plug member.

It is a third object of the present invention to provide an ink supply device in an ink jet recording apparatus which, when a plug member is attached in a sealing manner to a hermetically sealed ink bag formed of a flexible material, can improve the sealing property of the sealed portion and the shape holding ability.

It is a fourth object of the present invention to provide an ink supply device in an ink jet recording apparatus in which the work of assembling a plug member to an ink bag can be improved and the positioning of the ink bag when contained into the case of a cartridge can be easily accomplished and which can improve the shape holding ability within said case.

The present invention is applied to an ink supply device in an ink jet recording apparatus in which a plug member is attached in a sealing manner to a hermetically sealed ink bag formed of a flexible material so that ink in the ink bag may be supplied to a recording head through an ink supply path provided through the plug member.

Thus, the first object of the present invention is achieved by providing inside the plug member an ink leading-out portion comprising a concave hole opening into the ink bag and leading to the ink supply path.

The second object of the present invention is achieved by attaching a rubber plug in a sealing manner to a bore formed in the ink outlet portion of the plug member, and forming the ink supply path by a hollow needle piercing the rubber plug.

The third object of the present invention is achieved by forming the sealing surface of the plug member with respect to the ink bag by a peripheral wall portion protruding into the ink bag along a boat-like shape.

The fourth object of the present invention is achieved by providing the plug member with a flange against which the end edge of the ink bag strikes.

DESCRIPTION OF THE PREFERRED EMBODIMENT

The present invention will hereinafter be described specifically with reference to the drawings.

Figure 1:
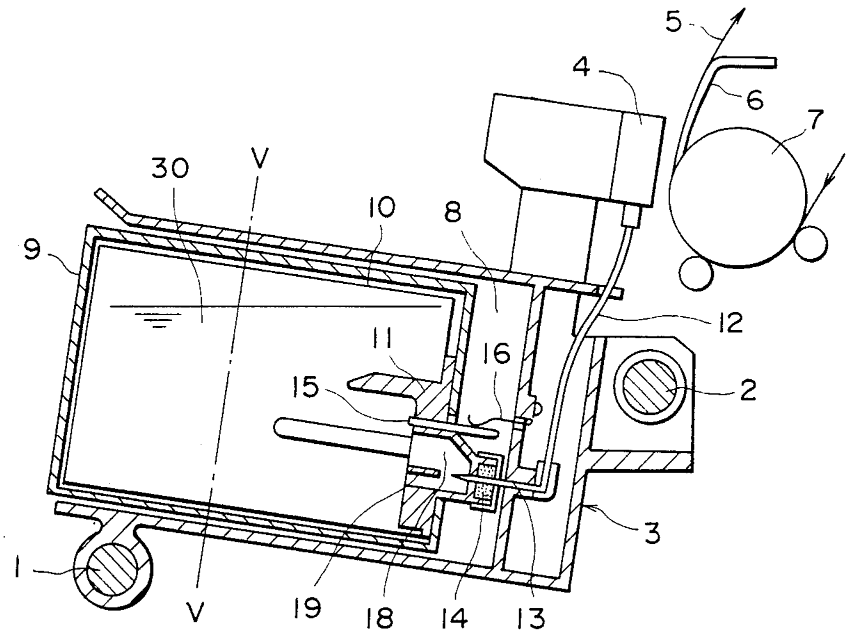
FIG. 1 is a longitudinal cross-sectional view of the essential portions of an ink jet recording apparatus embodying the present invention.

Referring to FIG. 1 which shows a longitudinal cross-sectional view of the essential portions of an ink jet recording apparatus provided with an ink supply device according to the present invention, a recording head 4 is mounted on a carriage 3 movable along guide shafts 1 and 2 and recording is effected on a sheet 5 by ink droplets injected from a plurality of ink discharge ports provided in the front face of the recording head. The sheet 5 is backed up by a platen 6 and is fed in the direction of arrow by a feed roller 7.

A cartridge 9 is interchangeably mounted in a chamber 8 formed in the carriage 3. A hermetically sealed ink bag 10 formed of a flexible material such as a plastic sheet is contained within the case of the cartridge 9, and the ink 30 in the ink bag is supplied to the recording head 4.

Figure 2:
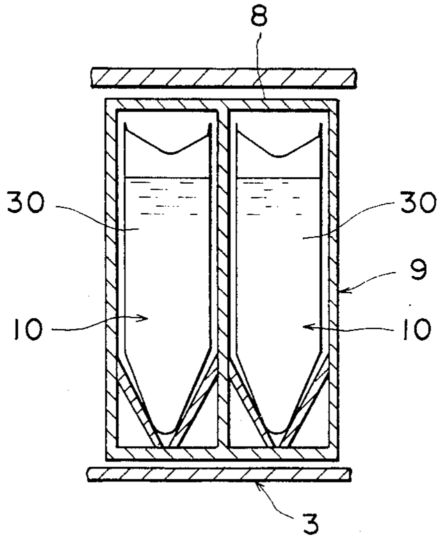
FIG. 2 is a cross-sectional view taken along line V—V in FIG. 1.

Generally, in the case of ordinary monochromatic printing, use is made of a single ink bag 10 and a single recording head 4, but where color printing is effected in a plurality of colors for example, yellow, cyan and black or where printing is effected in highlights and shading using a monochromatic ink, there may be provided a plurality of ink bags 10 and a plurality of recording heads in conformity with the kinds of ink. In the present embodiment, use is made of a cartridge 9 containing two ink bags 10 therein as shown in FIG. 2.

Each of the ink bags 10 is a hermetically sealed bag formed by affixing flexible materials such as plastic sheets with each other, and a plug member 11 is attached to the ink outlet portion of the ink bag in a sealing manner as by heat fusion. An ink supply path is formed through the plug member so that the ink 30 in the ink bag 10 may be supplied to the recording head (ink jet head) 4 through an ink supply tube 12.

The ink supply path extending through the plug member 11 is formed by causing a hollow needle 13 connected to one end of the ink supply tube 12 and fixed to the carriage 3 to pierce a rubber plug 14 closely fitted in a bore formed in the ink outlet portion of the plug member 11.

That is, when the cartridge 9 containing the ink bags 10 therein is mounted in the carriage 3, the rubber plug 14 is pierced by the hollow needle 13, through which the ink supply tube 12 may be communicated with the ink 30 in the ink bags 10.

The plug member 11 has secured thereto an electrode 15 of an electrically conductive material exposed to the ink 30 in the ink bags 10 and protruded outwardly, and when the cartridge 9 is mounted, the electrode 15 is adapted to resiliently contact a leaf spring 16 of an electrically conductive material attached to the carriage 3, whereby it may be electrically connected to the carriage 3 side.

On the other hand, the hollow needle 13 is also formed of an electrically conductive material such as steel, and is connected through an electrically conductive material, not shown, to a circuit for detecting the amount of remaining ink.

A pair of upper and lower electrodes comprising the electrode 15 and the hollow needle 13 is connected to a detecting circuit for measuring the electrical resistance therebetween, and is used to detect the amount of remaining ink by the presence of the ink having electrical conductivity.

Figure 3:
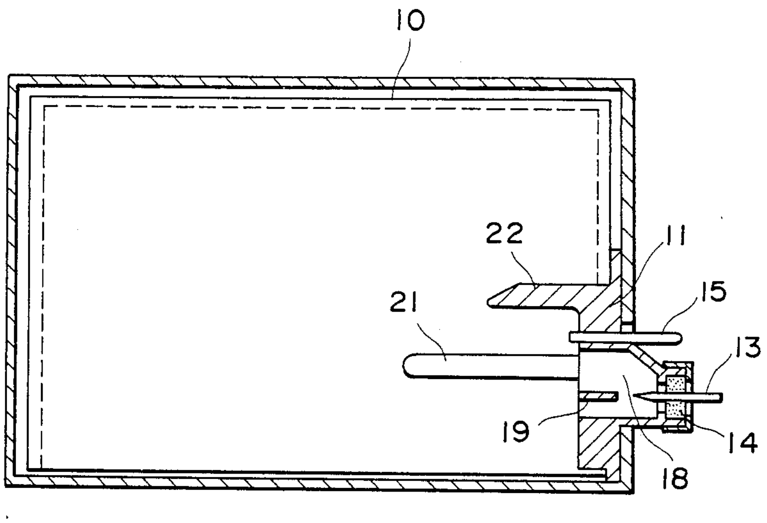
FIG. 3 is a longitudinal cross-sectional view of an ink supply device according to the present invention.
Figure 4:
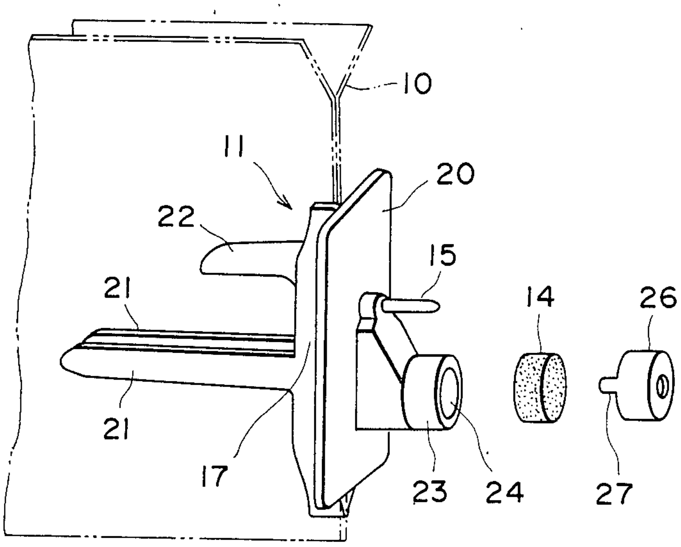
FIG. 4 is an external perspective view of the plug member of the ink supply device of FIG. 3.

FIG. 3 shows a longitudinal cross-section of the ink supply device comprising the cartridge 9, the ink bags 10 and the plug member 11, FIG. 4 is an exploded perspective view of the plug member 11 as seen obliquely from the outside thereof, and FIG. 3 is a perspective view of the plug member 11 as seen obliquely from the outside thereof, and FIG. 3 is a perspective view of the plug member 11 as seen obliquely from the inside thereof.

Figure 5:
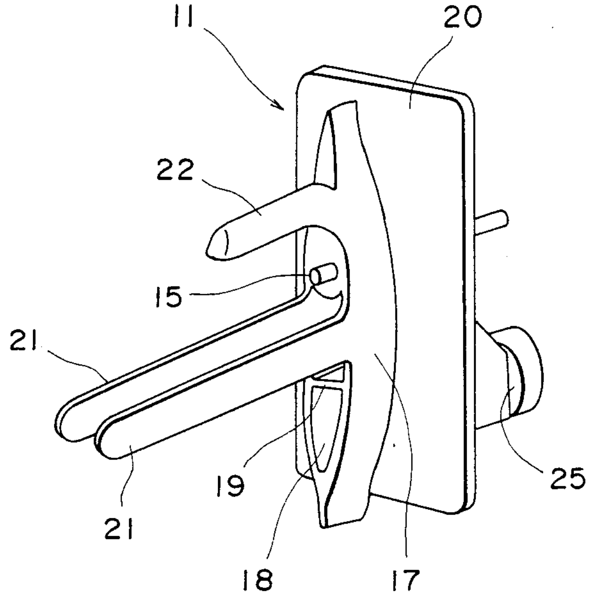
FIG. 5 is an internal perspective view of the plug member of FIG. 4.

Referring to FIGS. 3-5, the plug member 11 is secured to the ink outlet portion of the ink bag 10 in a sealing manner as by heat fusion.

This plug member 11 is a molded article of an insulating material such as plastics and is unitarily molded into a shape as shown.

The plug member 11 is provided with a joined surface comprising two side surfaces extending along the joined portion of the side edges of the plastic sheet forming the ink bag 10, and in the present embodiment, this joined surface 17 is formed by a peripheral wall portion inwardly protruding into the ink bag 10 along a vertical boat-like shape, as shown in FIG. 5.

By making the sealing joined surface 17 into a boat-like shape, the closely adhering property and fitness thereof with respect to the ink bag 10 are improved, the tool pressure when the plug member is secured as by heat fusion can be uniformized and thus, an enveloping portion excellent in reliability can be obtained.

Inside the plug member 11, that is, inside the peripheral wall portion forming the joined surface 17 of the boat-like shape in the illustrated embodiment, there is formed an ink leading-out portion 18 comprising a concave hole opening into the ink bag 10 and leading to the ink supply path (hollow needle 13).

This ink leading-out portion 18 is for preventing the outflow of the ink 30 from becoming unstable due to bubbles being produced in the ink, and may preferably be formed by as large a concave hole as possible.

Also, by the provision of the ink leading-out portion 18, bubbles are prevented from going round to the hollow needle 13, the contact of the hollow needle with the ink 30 is secured and the ink is reliably and stably led out to the ink supply tube 12.

The sealing surface with respect to the ink bag 10, i.e., the peripheral wall portion formed along the boat-like shape to form the joined surface 17, has its opposed inner surfaces connected by a rib-like reinforcing portion 19, and the joined surface 17 and 17 on the opposite sides are prevented from being crushed.

That is, the reinforcing portion 19 during sealing is provided on the joined surface 17 with respect to the ink bag 10, thereby preventing any reduction in the working property caused by the crush when the ink bag is assembled in a sealing manner during the pressure-securing step and any reduction in the reliability of the sealing.

Further, the plug member 11 is formed with a flange 20 extending in a perpendicular direction from the outer end of the joined surface 17 and adapted to be abutted against by the end edge of the ink bag 10 when the ink bag is heat-welded. By the provision of this flange 20, the ink bag 10 can be struck against the plug member 11 to thereby easily deduce the relative position thereof to the plug member 11, and as shown in FIGS. 3 and 2, the working property with which the plug member 11 is secured to the ink bag can be improved.

Also, the flange 20 may be provided at a position abutting against the case of the cartridge 9 when the ink bag 10 is contained into the case as shown in FIG. 3, and can be used to position the ink bag 10 relative to the cartridge 9. Thereby, the positioning and posture-holding of the ink bag 10 within the cartridge 9 can be accomplised easily and reliably.

Further, a pair of ribs 21 and 21, jutting inwardly so as to prevent the ink bag 10 from collapsing when it comes into close contact with the plug member 11, are formed as a unit on the opposite sides of the inner surface of the plug member 11. Also, a cover projection 22 which covers a part of the space between the pair of ribs 21 and 21 is formed integrally with the upper portion of the inner surface of the plug member 11.

An outwardly opening bore 24 is formed in the ink outlet portion 23 formed on the outer surface of the plug member 11, and the rubber plug 14 may be pressfitted into said bore 24 in a sealing manner. The rubber plug 14 is for piercing the ink outlet hollow needle 13 mounted on the carriage 3 side to form an ink supply path.

Further, in the illustrated embodiment, the ink outlet portion 23 of the plug member 11 is formed into a cylindrical shape jutting out sideways, and a neck 25 is attached to the base thereof. A metal cap 26 is fitted to the outer periphery of the ink outlet portion 23, and an anti-slippage projection 27 formed on the cap 26 is hooked to the neck 25 as by caulking, thereby preventing slipping-out of the cap 26 and accordingly, slipping-out of the rubber plug 14. The cap 26 is formed with an opening through which the hollow needle 13 may be inserted.

According to the present embodiment, the rubber plug 14 is fitted in a sealing manner into the bore 24 formed in the ink outlet portion 23 and the ink supply path is formed by the hollow needle 13 piercing the rubber plug 14 and therefore, an ink leading-out portion excellent in sealing performance can be formed.

Also, the neck 25 is attached to the ink outlet portion 23 and the metal cap 26 is fitted to the outer periphery of the ink outlet portion 23, and the anti-slippage projection 27 formed on the cap 26 is hooked to said neck by caulking to thereby secure the cap 26 and therefore, there can be provided an ink outlet structure which secures the rubber plug 14 and which is excellent in reliability and durability.

In the above-described embodiment, description has been made with resepct to the case of a serial type ink jet recording apparatus having a carriage 3, but the present invention is equally applicable to a line print type or a page print type ink jet recording apparatus.

Further, the present invention can be carried out in various modes irrespective of the numbers and mounted locations (as in the case where mounting is effected on the other portions of the recording apparatus body than the carriage 3) of the recording heads 4, the cartridges 9 and the ink bags 10.

As is apparent from the foregoing, according to the present invention, there is provided an ink supply device in an ink jet recording apparatus in which the improved reliability of the ink outlet portion of the hermetically sealed ink bag of a flexible material can be achieved when the ink is supplied from said ink bag to the recording head.

We claim:

1. An ink supply apparatus for an ink jet recording apparatus, comprising:

an ink bag made of a flexible material; and a plug member provided for leading out ink in said ink bag and attached to said ink bag in sealing manner to a hermetically sealed ink bag, a concaved hole being provided at the side plug member which is faced to the inside of said bag, a sealing surface of said plug member with respect to said bag being formed to be a boot-like shape, and a reinforcing portion being formed for bridging the inside of said concaved hole.

2. An ink supply apparatus according to claim 1, wherein said plug member has a rubber plug.

3. An ink supply apparatus according to claim 1, wherein said plug member has a flange against which an edge of said ink bag abuts.

4. An ink supply apparatus according to claim 1, further comprising a case surrounding said ink bag and at least one port of said plug member.

5. An ink supply apparatus according to claim 1, further comprising a case surrounding said ink bag and at least one part of said plug member, wherein said case is positioned by a flange provided in said plug member.

6. An ink supply apparatus according to claim 1, wherein said plug member has a pair of ribs projecting inside of said ink bag.

7. An ink supply apparatus according to claim 6, wherein said plug member has a cover projection covering at least one part of space between said pair of ribs.

8. An ink supply apparatus according to claim 2, wherein a neck projecting against an ink leading out portion is provided in said plug member.

9. An ink supply apparatus according to claim 2, wherein a cap having a opening for preventing slipping-out of said rubber plug is provided.

10. An ink supply apparatus according to claim 2, wherein a neck projecting against an ink leading out portion and a cap having an opening for preventing slipping-out of said rubber plug are provided.

11. An ink supply apparatus comprising:

an ink bag made of a flexible material; and a plug member provided for leading out ink in said ink bag and attached to said ink bag in sealing manner to a hermetically sealed ink bag, said plug member having a concaved hole provided at the side of said plug member which is faced to the inside of said bag, a rubber plug, a neck projecting against an ink leading out side thereof, a cap having an opening and attached to said neck, a pair of ribs projecting against the inside of said ink bag, a cover projection covering at least one part of space between said pair of ribs, and flange, a sealing surface of said plug member with respect to said bag being formed to be a boot-like shape.

12. An ink supply apparatus according to claim 11, wherein said ink supply apparatus has a case covering said ink bag and at least one part of said plug member.

13. An ink supply apparatus according to claim 11, wherein said ink supply apparatus a case surrounding said ink bag and at least one part of said plug member and is positioned by said flange.

14. An ink supply apparatus according to claim 11, wherein an electrode projecting against the inside of said ink bag is provided in said plug member.

15. An ink supply apparatus according to claim 11, wherein an electrode projecting against the inside of said ink bag is provided in said plug member.

16. An ink supply apparatus according to claim 11, wherein a reinforcing portion is formed for bridging the inside of said concaved hole.

17. An ink supply apparatus according to claim 12, wherein a reinforcing portion is formed for bridging the inside of said concaved hole.

18. An ink supply apparatus according to claim 13, wherein a reinforcing portion is formed for bridging the inside of said concaved hole.

* * * * *

UNITED STATES PATENT AND TRADEMARK OFFICE

CERTIFICATE OF CORRECTION

PATENT NO. : 4,760,409

DATED : July 26, 1988

INVENTOR(S) : TAKEHIKO KIYOHARA, ET AL.

It is certified that error appears in the above-identified patent and that said Letters Patent is hereby corrected as shown below:

COLUMN 1

Line 26, "ink," should read --ink--.
Line 27, "ink or cause" should read --ink, or--.

COLUMN 3

Line 58, "thereof, and Fig. 3 is a perspective" should read --thereof.--.
Line 59, the entire line should be deleted.
Line 60, the entire line should be deleted.
Line 61, the entire line should be deleted.
Line 62, the entire line should be deleted.

COLUMN 4

Line 58, "complised" should read --complished--.

COLUMN 5

Line 32, "resepct" should read --respect--.
Line 57, "side plug member" should read --side of said plug member--.
Line 60, "boot-like" should read --boat-like--.

UNITED STATES PATENT AND TRADEMARK OFFICE
CERTIFICATE OF CORRECTION

PATENT NO. : 4,760,409

DATED : July 26, 1988

INVENTOR(S) : TAKEHIKO KIYOHARA, ET AL.

It is certified that error appears in the above-identified patent and that said Letters Patent is hereby corrected as shown below:

COLUMN 6

Line 21, "a" (second occurrence) should read --an--.
Line 41, "boot-like" should read --boat-like--.
Line 46, "apparatus a" should read --apparatus has a--.

Signed and Sealed this

Fourteenth Day of February, 1989

*Attest:*

DONALD J. QUIGG

*Attesting Officer*

*Commissioner of Patents and Trademarks*